United States Patent
Jin

(10) Patent No.: US 12,471,438 B2
(45) Date of Patent: Nov. 11, 2025

(54) FLEXIBLE DISPLAY DEVICE INCLUDING ADHESIVE MEMBER HAVING MULTI-LAYERED STRUCTURE

(71) Applicant: LG Display Co., Ltd., Seoul (KR)

(72) Inventor: JaeHyun Jin, Seoul (KR)

(73) Assignee: LG Display Co., Ltd., Seoul (KR)

( * ) Notice: Subject to any disclaimer, the term of this patent is extended or adjusted under 35 U.S.C. 154(b) by 532 days.

(21) Appl. No.: 17/957,705

(22) Filed: Sep. 30, 2022

(65) Prior Publication Data

US 2023/0106970 A1 Apr. 6, 2023

(30) Foreign Application Priority Data

Oct. 1, 2021 (KR) .................. 10-2021-0131105

(51) Int. Cl.
*H10K 50/84* (2023.01)
*H10K 50/842* (2023.01)
*G06F 1/16* (2006.01)
*H10K 102/00* (2023.01)

(52) U.S. Cl.
CPC ....... *H10K 50/8426* (2023.02); *G06F 1/1641* (2013.01); *H10K 2102/311* (2023.02)

(58) Field of Classification Search
CPC .. H10K 50/8426; H10K 50/844; H10K 50/84; H10K 77/111; G09F 9/301; G09F 9/335; C09J 7/38; G06F 1/1641
See application file for complete search history.

(56) References Cited

U.S. PATENT DOCUMENTS

| 10,930,881 | B2 * | 2/2021 | Kwon | H10K 59/12 |
| 11,250,737 | B2 * | 2/2022 | Park | H10K 59/122 |
| 2017/0323779 | A1 | 11/2017 | Um et al. | |
| 2020/0022261 | A1 * | 1/2020 | Choi | H05K 1/0203 |
| 2020/0163231 | A1 * | 5/2020 | Park | G06F 1/1652 |
| 2020/0185641 | A1 * | 6/2020 | Jeong | H10K 50/84 |
| 2021/0005690 | A1 * | 1/2021 | Lee | G06F 3/0446 |
| 2021/0175462 | A1 * | 6/2021 | Shin | G06F 1/1601 |

(Continued)

FOREIGN PATENT DOCUMENTS

| CN | 104877589 A | 9/2015 |
| CN | 110009996 A | 7/2019 |

(Continued)

*Primary Examiner* — Ida M Soward
(74) *Attorney, Agent, or Firm* — Seed Intellectual Property Law Group LLP

(57) ABSTRACT

A flexible display device example includes a display panel including an active area, a non-active area, and a bending area and having one edge that is bent in a rear direction to have a predetermined curvature, first and second back plates disposed on a rear surface of the display panel, a metal plate disposed on a rear surface of the first back plate and an adhesive member disposed between the metal plate and the second back plate, and including a support layer, a first adhesive layer and a third adhesive layer disposed on an upper portion of the support layer, and a second adhesive layer disposed on a lower portion of the support layer, wherein the third adhesive layer may include a conductive material and may have conductivity. Thus, fixing force of a bending portion may increase, thereby preventing cracks in the bending portion that may occur during drop evaluation.

18 Claims, 10 Drawing Sheets

(56) References Cited

U.S. PATENT DOCUMENTS

| | | | |
|---|---|---|---|
| 2021/0202460 A1* | 7/2021 | Shin | H01L 25/18 |
| 2021/0255367 A1* | 8/2021 | Kim | H10K 59/873 |
| 2021/0280093 A1* | 9/2021 | Zhu | G09F 9/301 |
| 2021/0288282 A1 | 9/2021 | Kim et al. | |
| 2022/0058990 A1* | 2/2022 | Yoo | H10K 59/873 |
| 2022/0061169 A1* | 2/2022 | Shin | G06F 1/1643 |

FOREIGN PATENT DOCUMENTS

| | | | | |
|---|---|---|---|---|
| CN | 111326071 A | | 6/2020 | |
| CN | 112397549 A | | 2/2021 | |
| CN | 112736112 A | * | 4/2021 | H10K 59/8794 |
| CN | 113053948 A | * | 6/2021 | G09F 9/301 |
| DE | 102020134206 A1 | * | 7/2021 | G02B 1/10 |
| JP | 2020125390 A | | 8/2020 | |
| KR | 20210074061 A | | 6/2021 | |

* cited by examiner

FLEXIBLE DISPLAY DEVICE INCLUDING ADHESIVE MEMBER HAVING MULTI-LAYERED STRUCTURE

CROSS-REFERENCE TO RELATED APPLICATIONS

This application claims the benefit of and priority to Korean Patent Application No. 10-2021-0131105 filed on Oct. 1, 2021 in the Republic of Korea, the entire contents of which are hereby expressly incorporated by reference into the present application.

BACKGROUND

Technical Field

The present disclosure relates to a flexible display device, and more particularly, to a flexible display device allowing for a reduction in a bezel width.

Description of the Related Art

As our society advances toward an information-oriented society, the field of display devices for visually expressing an electrical information signal has rapidly advanced. Various display devices having excellent performance in terms of thinness, lightness, and low power consumption, are being developed correspondingly.

Representative display devices include a liquid crystal display device (LCD), a field emission display device (FED), an electro-wetting display device (EWD), an organic light emitting display device (OLED), and the like.

BRIEF SUMMARY

An electroluminescent display device which is represented by an organic light emitting display device, is a self-light emitting display device, and can be manufactured to be light and thin since it does not require a separate light source, unlike a liquid crystal display device having a separate light source. In addition, the electroluminescent display device has advantages in terms of power consumption due to a low voltage driving, and is excellent in terms of a color implementation, a response speed, a viewing angle, and a contrast ratio (CR). Therefore, electroluminescent display devices are expected to be utilized in various fields.

In the electroluminescent display device, a light emitting layer is disposed between two electrodes that are formed of an anode and a cathode. When holes from the anode are injected into the light emitting layer and electrons from the cathode are injected into the light emitting layer, the injected electrons and holes recombine with each other to form excitons in the light emitting layer and emit light.

The light emitting layer contains a host material and a dopant material. The two materials interact with each other, so that a host generates excitons from the electrons and holes and transfers energy to a dopant, and the dopant is a dye-based organic material added in a small amount, and receives energy from the host and converts it into light.

The electroluminescent display device is encapsulated with glass, metal, or film to block the introduction of moisture or oxygen from the outside to the interior of the electroluminescent display device, thereby preventing oxidation of the emissive layer or the electrode and protecting it from external mechanical or physical impacts.

With regard to a flexible electroluminescent display device capable of maintaining a display performance even when bent, by applying a flexible substrate formed of a flexible material such as plastic, there is an effort to reduce a bezel area by bending a non-active area of the flexible substrate so as to reduce the bezel area, while securing an area for lines and a driving circuit. Hereinafter, such a display device will be referred to as a bezel-bending display device for convenience.

Accordingly, the inventors of the present disclosure have recognized the limitations described above and have invented a flexible display device having a reduced bezel width.

Electroluminescent display devices using a flexible substrate such as plastic or the like need to secure flexibility of various insulating layers and lines formed of a metal material that are disposed on the substrate and to prevent defects such as cracks that may be caused by bending.

A protective layer such as a micro-coating layer is disposed over the insulating layers and lines in a bending area to prevent the occurrence of cracks and protect the lines from an external foreign material. The protective layer may be coated to have a predetermined thickness and serve to adjust a neutral plane of the bending area.

In recently developed electroluminescent display devices for minimizing the bezel area and allowing for a reduction in thickness of the display device, a bending area of a flexible substrate has an extreme curvature and a thickness of the micro-coating layer is minimized.

In particular, among bezel-bending display devices (hereinafter, referred to as a bezel-bending display device having a curvature for convenience), in a case where a bending area has a curvature and is bent, pressure sensitive adhesive (PSA) of a soft foam material is used to fix a bending portion. At this time, in evaluating an impact (drop) of a flexible display device, cracks may occur in the bending portion due to interference between the bending portion and components, and in the case of the soft foam material, movement (flow) of the bending portion may increase.

Accordingly, the inventors of the present disclosure have invented a flexible display device that implements a bezel-bending structure having a curvature that enhances grounding force while increasing fixing force of the bending portion.

Objects of the present disclosure are not limited to the above-mentioned objects, and other objects, which are not mentioned above, can be clearly understood by those skilled in the art from the following descriptions.

A flexible display device according to an example embodiment of the present disclosure may include a display panel including an active area, a non-active area, and a bending area and having one edge that is bent in a rear direction to have a predetermined curvature, first and second back plates disposed on a rear surface of the display panel, a metal plate disposed on a rear surface of the first back plate and an adhesive member disposed between the metal plate and the second back plate, and including a support layer, a first adhesive layer and a third adhesive layer disposed on an upper portion of the support layer, and a second adhesive layer disposed on a lower portion of the support layer, wherein the third adhesive layer may include a conductive material and have conductivity.

A flexible display device according to another example embodiment of the present disclosure may include a display panel including a first flat portion, a second flat portion facing the first flat portion, and a curved portion extending from the first flat portion and bent in a rear direction, and positioned between the first flat portion and the second flat portion; a first back plate positioned on a rear surface of the first flat portion and a second back plate positioned on a rear surface of the second flat portion; a metal plate disposed on a rear surface of the first back plate; and an adhesive member disposed between the metal plate and the second back plate, and including a support layer, a first adhesive layer attached to an upper surface of the support layer, and a second adhesive layer attached to a lower surface of the support layer, wherein the support layer is made of a metal material.

Other detailed matters of the example embodiments are included in the detailed description and the drawings.

A flexible display device according to an example embodiment of the present disclosure may provide effects of improving an aesthetic sense by reducing a bezel width.

A flexible display device according to an example embodiment of the present disclosure may provide effects of improving quality of the flexible display device by preventing cracks in a bending portion that may occur during drop evaluation through an increase in fixing force of the bending portion.

A flexible display device according to an example embodiment of the present disclosure provides an effect of providing a flexible display device allowing for enhancement in grounding force by increasing a ground path.

Effects of the flexible display device according to the example embodiment of the present disclosure are not limited by exemplified contents described above, and more various effects thereof are included in the present disclosure.

DETAILED DESCRIPTION

Figure 1:
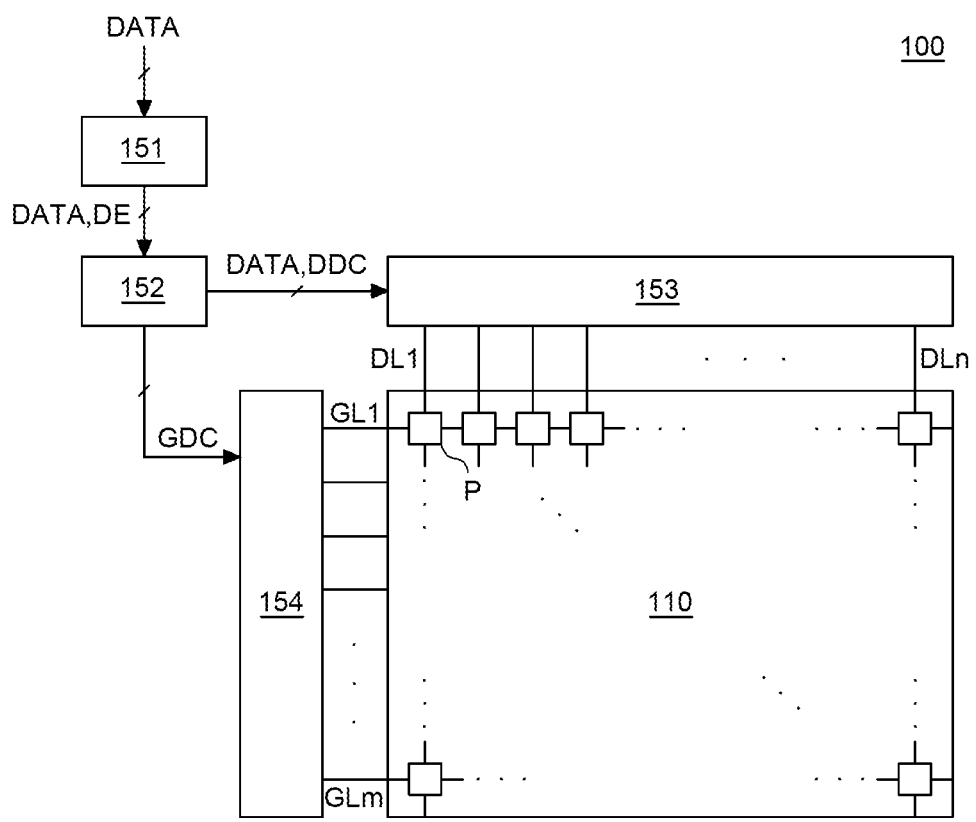
FIG. 1 is a block diagram of a flexible display device according to a first example embodiment of the present disclosure.

Advantages and characteristics of the present disclosure and a method of achieving the advantages and characteristics will be clear by referring to example embodiments described below in detail together with the accompanying drawings. However, the present disclosure is not limited to the example embodiments disclosed herein but will be implemented in various forms. The example embodiments are provided by way of example only so that those skilled in the art can fully understand the disclosures of the present disclosure and the scope of the present disclosure.

The shapes, sizes, ratios, angles, numbers, and the like illustrated in the accompanying drawings for describing the example embodiments of the present disclosure are merely examples, and the present disclosure is not limited thereto. Like reference numerals generally denote like elements throughout the specification. Further, in the following description of the present disclosure, a detailed explanation of known related technologies may be omitted to avoid unnecessarily obscuring the subject matter of the present disclosure. The terms such as "including," "having," and "consist of" used herein are generally intended to allow other components to be added unless the terms are used with the term "only". Any references to singular may include plural unless expressly stated otherwise.

Components are interpreted to include an ordinary error range even if not expressly stated.

When the position relation between two parts is described using the terms such as "on", "above", "below", and "next", one or more parts may be positioned between the two parts unless the terms are used with the term "immediately" or "directly".

When an element or layer is disposed "on" another element or layer, another layer or another element may be interposed directly on the other element or therebetween.

Although the terms "first", "second", and the like are used for describing various components, these components are not confined by these terms. These terms are merely used for distinguishing one component from the other components. Therefore, a first component to be mentioned below may be a second component in a technical concept of the present disclosure.

Like reference numerals generally denote like elements throughout the specification.

A size and a thickness of each component illustrated in the drawing are illustrated for convenience of description, and the present disclosure is not limited to the size and the thickness of the component illustrated.

The features of various embodiments of the present disclosure can be partially or entirely adhered to or combined with each other and can be interlocked and operated in technically various ways, and the embodiments can be carried out independently of or in association with each other.

Hereinafter, example embodiments of the present disclosure will be described in detail with reference to accompanying drawings.

FIG. 1 is a block diagram of a flexible display device according to a first example embodiment of the present disclosure.

Referring to FIG. 1, a flexible display device 100 according to the first example embodiment of the present disclosure may include an image processor 151, a timing controller 152, a data driver 153, a gate driver 154, and a display panel 110.

The image processor 151 may output a data signal DATA and a data enable signal DE through a data signal DATA supplied from the outside.

The image processor 151 may output one or more of a vertical synchronization signal, a horizontal synchronization signal, and a clock signal in addition to the data enable signal DE.

The timing controller 152 receives the data signal DATA together with the data enable signal DE or driving signals including the vertical synchronization signal, the horizontal synchronization signal, and the clock signal from the image processor 151. The timing controller 152 may output a gate timing control signal GDC for controlling an operation timing of the gate driver 154 and a data timing control signal DDC for controlling an operation timing of the data driver 153 based on the driving signals.

The data driver 153 samples and latches the data signal DATA supplied from the timing controller 152 in response to the data timing control signal DDC supplied from the timing controller 152, and converts the data signal DATA into a gamma reference voltage to output it. The data driver 153 may output the data signal DATA through data lines DL1 to DLn.

The gate driver 154 may output a gate signal while shifting a level of the gate voltage in response to the gate timing control signal GDC supplied from the timing controller 152. The gate driver 154 may output the gate signal through gate lines GL1 to GLm.

The display panel 110 may display an image while sub-pixels P emit light in response to the data signal DATA supplied from the data driver 153 and the gate signal supplied from the gate driver 154. A detailed structure of the sub-pixel P will be described in detail in FIG. 2 and FIGS. 4A and 4B.

Figure 2:
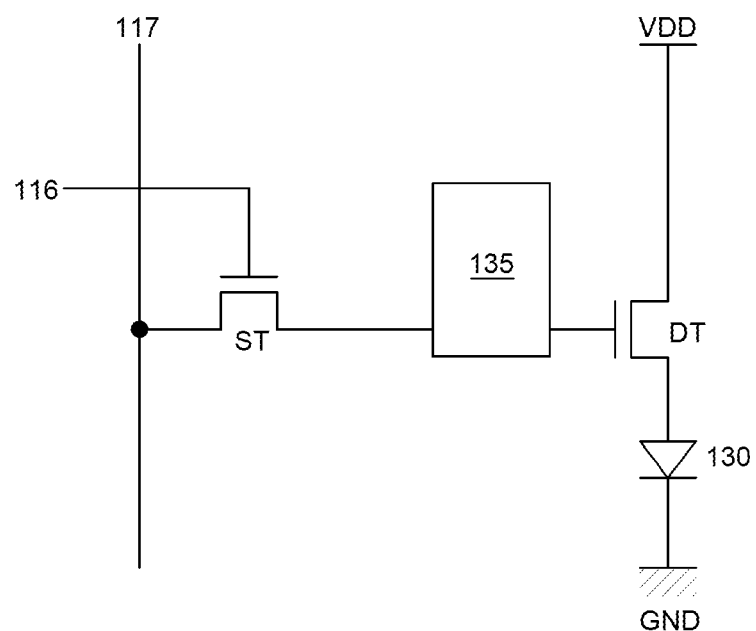
FIG. 2 is a circuit diagram of a sub-pixel included in the flexible display device according to the first example embodiment of the present disclosure.

FIG. 2 is a circuit diagram of a sub-pixel included in the flexible display device according to the first example embodiment of the present disclosure.

Referring to FIG. 2, the sub-pixel of the flexible display device 100 according to the first example embodiment of the present disclosure may include a switching transistor ST, a driving transistor DT, a compensation circuit 135, and a light emitting element 130.

The light emitting element 130 may operate to emit light according to a driving current that is formed by the driving transistor DT.

The switching transistor ST may perform a switching operation such that a data signal supplied through a data line 117 in response to the gate signal supplied through a gate line 116 is stored as a data voltage in a capacitor.

The driving transistor DT may operate such that a constant driving current flows between a high potential power line VDD and a low potential power line GND in response to the data voltage stored in the capacitor.

The compensation circuit 135 is a circuit for compensating for a threshold voltage or the like of the driving transistor DT, and the compensation circuit 135 may include one or more thin film transistors and capacitors. A configuration of the compensation circuit 135 may vary according to a compensation method.

It is illustrated that the sub-pixel shown in FIG. 2 is configured to have a 2T(Transistor)1C (Capacitor) structure including the switching transistor ST, the driving transistor DT, the capacitor, and the light emitting element 130. However, the sub-pixel may have various structures, such as 3T1C, 4T2C, 5T2C, 6T1C, 6T2C, 7T1C and 7T2C structures when the compensation circuit 135 is added thereto.

Figure 3:
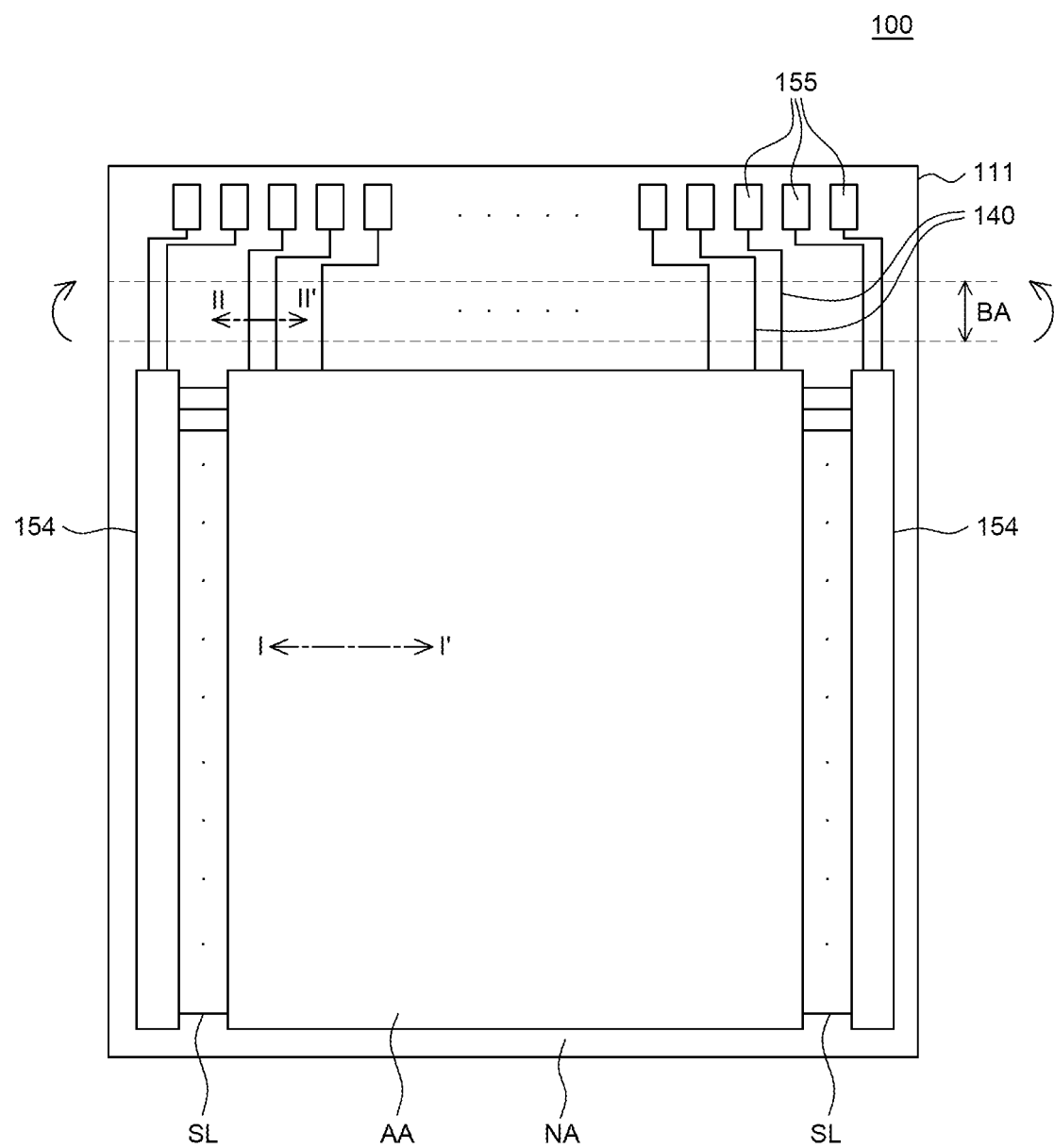
FIG. 3 is a plan view of the flexible display device according to the first example embodiment of the present disclosure.

FIG. 3 is a plan view of the flexible display device according to the first example embodiment of the present disclosure.

FIG. 3 illustrates an example in which a flexible substrate 111 is not bent in the flexible display device 100 according to the first example embodiment of the present disclosure.

Referring to FIG. 3, the flexible display device 100 may include an active area AA in which pixels actually emitting light through thin film transistors and light emitting elements are disposed on the flexible substrate 111, and a non-active area NA that is a bezel area surrounding edges of the active area AA.

In the non-active area NA of the flexible substrate 111, a circuit such as the gate driver 154 for driving of the flexible display device 100 and the like, and various signal lines such as a scan line SL and the like may be disposed.

The circuit for driving of the flexible display device 100 is disposed on the substrate 111 in a gate in panel (GIP) method, or may be connected to the flexible substrate 111 in a tape carrier package (TCP) or chip on film (COF) method.

Pads 155, which are metal patterns, may be disposed on one side of the substrate 111 in the non-active area NA so that an external module may be bonded.

A bending area BA may be formed by bending a portion of the non-active area NA of the flexible substrate 111 in a bending direction as indicated by arrows.

The non-active area NA of the flexible substrate 111 is an area where lines and driving circuits for driving a screen are disposed. Since the non-active area NA is not an area where an image is displayed, it is unnecessary to be viewed from an upper surface of the flexible substrate 111. Thus, by bending a portion of the non-active area NA of the flexible substrate 111, the bezel area BA may be reduced, while securing an area for the lines and driving circuits.

Various lines may be formed on the flexible substrate 111. The lines may be formed in the active area AA of the flexible substrate 111, or circuit lines 140 formed in the non-active area NA may connect the driving circuits or the gate driver, the data driver, and the like to each other to transfer signals.

The circuit lines 140 are formed of a conductive material, and may be formed of a conductive material having excellent ductility in order to reduce the occurrence of cracks when the flexible substrate 111 is bent. The circuit lines 140 may be formed of a conductive material having excellent ductility such as gold (Au), silver (Ag), or aluminum (Al), or may be formed of one of various conductive materials used in the active area AA. The circuit lines 140 may also be formed of molybdenum (Mo), chromium (Cr), titanium (Ti), nickel (Ni), neodymium (Nd), copper (Cu), and alloys of silver (Ag) and magnesium (Mg).

For example, the circuit lines 140 may be formed of a multilayer structure including various conductive materials, and may be formed of a three-layer structure of titanium (Ti)/aluminum (Al)/titanium (Ti), but the present disclosure is not limited thereto.

The circuit lines 140 formed in the bending area BA receive tensile force when bent. The circuit lines 140 extending in the same direction as the bending direction on the flexible substrate 111 receive the greatest tensile force, so that cracks or disconnection may occur therein. Therefore, rather than forming the circuit lines 140 to extend in the bending direction, at least a portion of the circuit lines 140 disposed in an area including the bending area BA is formed to extend in a diagonal direction, which is a direction different from the bending direction, so that the tensile force may be minimized.

The circuit line 140 disposed in an area including the bending area BA may be variously shaped, and may be formed in a shape such as a trapezoidal wave shape, a triangular wave shape, a sawtooth wave shape, a sinusoidal wave shape, an omega (Ω) shape, a rhombus shape, or the like.

Figure 4A:
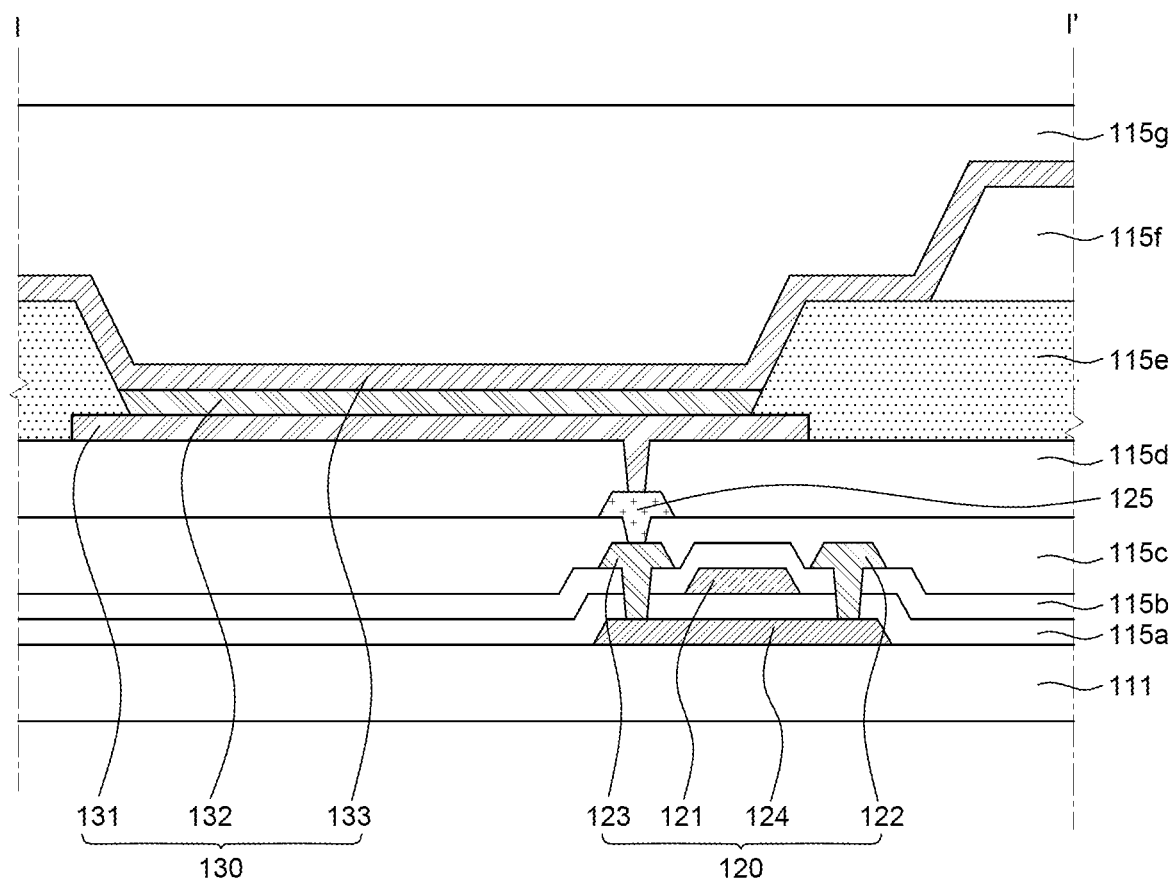
FIG. 4A is a cross-sectional view taken along line I-I' of FIG. 3.

FIG. 4A is a cross-sectional view taken along line I-I' of FIG. 3.

Figure 4B:
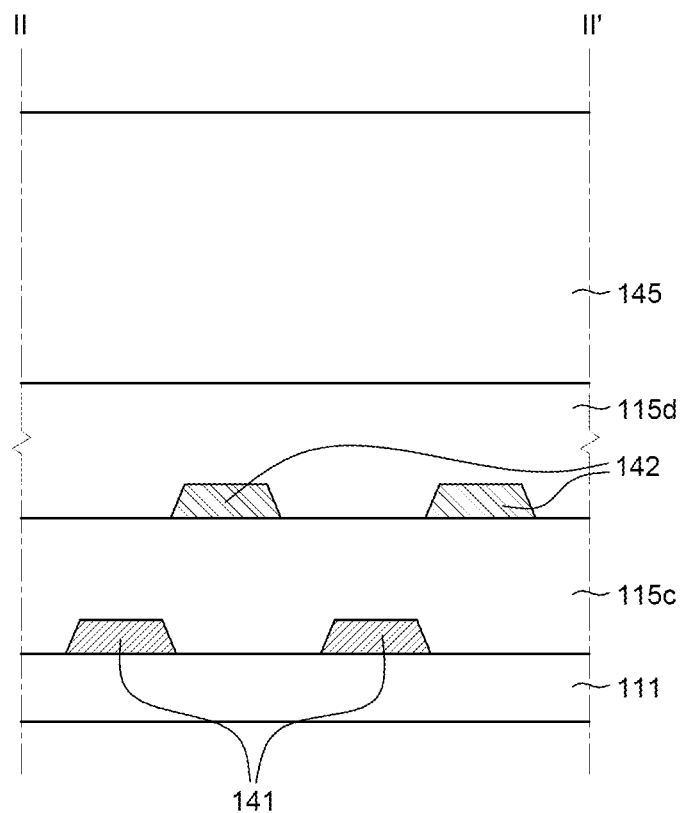
FIG. 4B is a cross-sectional view taken along line II-II' of FIG. 3.

FIG. 4B is a cross-sectional view taken along line II-II' of FIG. 3.

FIG. 4A is a detailed cross-sectional view taken along line I-I' of the active area AA described in FIG. 3.

First, referring to FIG. 4A, the flexible substrate 111 serves to support and protect components of the flexible display device 100 disposed thereon.

Recently, the flexible substrate 111 may be formed of a ductile material having flexible characteristics such as plastic.

The flexible substrate 111 may be in the form of a film including one of the group consisting of a polyester-based polymer, a silicone-based polymer, an acrylic polymer, a polyolefin-based polymer, and a copolymer thereof.

For example, the flexible substrate 111 may be formed of at least one of polyethylene terephthalate (PET), polybutylene terephthalate (PBT), polysilane, polysiloxane, polysilazane, polycarbosilane, polyacrylate, polymethacrylate, polymethylacrylate, polymethylmetacrylate, polyethylacrylate, polyethylmethacrylate, a cyclic olefin copolymer (COC), a cyclic olefin polymer (COP), polyethylene (PE), polypropylene (PP), polyimide (PI), polymethylmethacrylate (PMMA), polystyrene (PS), polyacetal (POM), polyether ether ketone (PEEK), polyestersulfone (PES), polytetrafluoroethylene (PTFE), polyvinylchloride (PVC), polycarbonate (PC), polyvinylidenefluoride (PVDF), a perfluoroalkyl polymer (PFA), a styrene acrylonitrile copolymer (SAN), and combinations thereof.

A buffer layer may be further disposed on the flexible substrate 111. The buffer layer prevents penetration of moisture or other impurities from the outside through the flexible substrate 111 and may planarize a surface of the flexible substrate 111. The buffer layer is not a necessarily necessary component, and may be deleted depending on a type of a thin film transistor 120 disposed on the flexible substrate 111.

The thin film transistor 120 may be disposed on the flexible substrate 111 and may include a gate electrode 121, a source electrode 122, a drain electrode 123 and a semiconductor layer 124.

In this case, the semiconductor layer 124 may be formed of amorphous silicon or polycrystalline silicon, but is not limited thereto. Polycrystalline silicon has superior mobility than amorphous silicon and low energy power consumption and excellent reliability, and thus, may be applied to a driving thin film transistor within the pixel.

The semiconductor layer 124 may be formed of an oxide semiconductor. The oxide semiconductor has excellent mobility and uniformity properties. The oxide semiconductor may be formed of a quaternary metal oxide such as an indium tin gallium zinc oxide (InSnGaZnO)-based material, a ternary metal oxide such as an indium gallium zinc oxide (InGaZnO)-based material, an indium tin zinc oxide (InSnZnO)-based material, an tin gallium zinc oxide (SnGaZnO)-based material, an aluminum gallium zinc oxide (AlGaZnO)-based material, an indium aluminum zinc oxide (InAlZnO)-based material, and a tin aluminum zinc oxide (SnAlZnO)-based material, or a binary metal oxide such as an indium zinc oxide (InZnO)-based material, a tin zinc oxide (SnZnO)-based material, an aluminum zinc oxide (AlZnO)-based material, a zinc magnesium oxide (ZnMgO)-based material, a tin magnesium oxide (SnMgO)-based material, an indium magnesium oxide (InMgO)-based material, an indium gallium oxide (InGaO)-based material, an indium oxide (InO)-based material, a tin oxide (SnO)-based material, and a zinc oxide (ZnO)-based material. Composition ratios of the respective elements are not limited.

The semiconductor layer 124 may include a source region including a p-type or n-type impurity, a drain region, and a channel region between the source region and the drain region. The semiconductor layer 124 may further include a low concentration-doped region between the source region and the drain region adjacent to the channel region.

The source region and the drain region are doped with a high concentration of impurity, and may be connected to the source electrode 122 and the drain electrode 123 of the thin film transistor 120, respectively.

As an impurity ion, the p-type impurity or n-type impurity may be used. The p-type impurity may be one of boron (B), aluminum (Al), gallium (Ga), and indium (In), and the n-type impurity may be one of phosphorus (P), arsenic (As), and antimony (Sb).

The channel region of the semiconductor layer 124 may be doped with the n-type impurity or p-type impurity according to an NMOS or PMOS thin film transistor structure, and the thin film transistor included in the flexible display device 100 according to the first example embodiment of the present disclosure may be an NMOS or PMOS thin film transistor.

A first insulating layer 115a is an insulating layer composed of a single layer of silicon oxide (SiOx) or silicon nitride (SiNx) or multiple layers thereof, and may be disposed on the semiconductor layer 124 such that a current flowing through the semiconductor layer 124 does not flow to the gate electrode 121. In this case, silicon oxide is less ductile than metal, but is superior in ductility to silicon nitride, and may be formed as a single layer or multiple layers depending on characteristics thereof.

The gate electrode 121 serves as a switch for turning on or turning off the thin film transistor 120 based on an electric signal transmitted from the outside through the gate line, and may be composed of a single layer or multiple layers of a conductive metal such as copper (Cu), aluminum (Al), molybdenum (Mo), chromium (Cr), gold (Au), titanium (Ti), nickel (Ni), and neodymium (Nd), or alloys thereof. However, the present disclosure is not limited thereto.

The source electrode 122 and the drain electrode 123 are connected to the data line, and may enable an electric signal that is transmitted from the outside to be transmitted from the thin film transistor 120 to the light emitting element 130. The source electrode 122 and the drain electrode 123 may be composed of a single layer or multiple layers of a conductive metal such as copper (Cu), aluminum (Al), molybdenum (Mo), chromium (Cr), gold (Au), titanium (Ti), nickel (Ni), and neodymium (Nd), or alloys thereof, but are not limited thereto.

In this case, to insulate the gate electrode 121 and the source electrode 122 and the drain electrode 123 from each other, a second insulating layer 115b composed of a single layer or multiple layers of silicon oxide (SiOx) or silicon nitride (SiNx) may be disposed between the gate electrode 121 and the source electrode 122 and the drain electrode 123.

A passivation layer formed of an inorganic insulating layer such as silicon oxide (SiOx) or silicon nitride (SiNx) may be disposed on the thin film transistor 120.

The passivation layer may prevent unnecessary electrical connections between components disposed over and under the passivation layer and prevent contamination or damage from the outside. The passivation layer may be omitted depending on configurations and characteristics of the thin film transistor 120 and the light emitting element 130.

Structures of the thin film transistor 120 may be divided into an inverted-staggered structure and a coplanar structure according to positions of elements constituting the thin film transistor 120. For example, the thin film transistor having an inverted-staggered structure refers to a thin film transistor having a structure in which a gate electrode is positioned opposite to a source electrode and a drain electrode based on the semiconductor layer. As in FIG. 4A, the thin film transistor 120 having a coplanar structure refers to a thin film transistor having a structure in which the gate electrode 121 is positioned on the same side as the source electrode 122 and the drain electrode 123 based on the semiconductor layer 124.

In FIG. 4A, the thin film transistor 120 having a coplanar structure is illustrated, but the flexible display device 100 according to the first example embodiment of the present disclosure may also include a thin film transistor having an inverted-staggered structure.

For convenience of description, only a driving thin film transistor is illustrated from among various thin film transistors that may be included in the flexible display device 100. And, a switching thin film transistor, a capacitor, or the like may also be included in the flexible display device 100.

In addition, when a signal is applied from the gate line to the switching thin film transistor, the switching thin film transistor transmits the signal from the data line to a gate electrode of the driving thin film transistor. The driving thin film transistor may transmit a current transferred through power lines to an anode 131 by the signal transmitted from the switching thin film transistor, and control light emission by the current transmitted to the anode 131.

Planarization layers 115c and 115d may be disposed on the thin film transistor 120 to protect the thin film transistor 120, to alleviate a step caused by the thin film transistor 120, and to reduce parasitic capacitance generated between the thin film transistor 120 and the gate line and the data line, and the light emitting elements 130.

The planarization layers 115c and 115d may be formed of one or more of acrylic resin, epoxy resin, phenolic resin, polyamides resin, polyimides resin, unsaturated polyesters resin, polyphenylene resin, polyphenylene sulfides resin and benzocyclobutene, but are not limited thereto.

The flexible display device 100 according to the first example embodiment of the present disclosure may include a first planarization layer 115c and a second planarization layer 115d that are sequentially stacked. That is, the first planarization layer 115c may be disposed on the thin film transistor 120 and the second planarization layer 115d may be disposed on the first planarization layer 115c.

A buffer layer may be disposed on the first planarization layer 115c. The buffer layer may be composed of multiple layers of silicon oxide (SiOx) to protect components disposed on the first planarization layer 115c, and may be omitted depending on configurations and characteristics of the thin film transistor 120 and the light emitting element 130.

An intermediate electrode 125 may be connected to the thin film transistor 120 through a contact hole formed in the first planarization layer 115c. The intermediate electrode 125 is stacked so as to be connected to the thin film transistor 120, and the data line may also be formed in a multilayer structure.

The data line may be formed to have a structure in which a lower layer formed of the same material as the source electrode 122 and the drain electrode 123 and an upper layer formed of the same material as the intermediate electrode 125 are connected to each other. That is, the data line may be implemented in a structure in which two layers are connected in parallel to each other, and in this case, line resistance of the data line may be reduced.

Meanwhile, a passivation layer formed of an inorganic insulating layer such as silicon oxide (SiOx) or silicon nitride (SiNx) may be further disposed on the first planarization layer 115c and the intermediate electrode 125. The passivation layer may serve to prevent unnecessary electrical connections between components and to prevent contamination or damage from the outside, and may be omitted depending on configurations and characteristics of the thin film transistor 120 and the light emitting element 130.

The light emitting element 130 that is disposed on the second planarization layer 115d may include the anode 131, a light emitting unit 132, and a cathode 133.

The anode 131 may be disposed on the second planarization layer 115d.

The anode 131 serves to supply holes to the light emitting unit 132 and may be connected to the intermediate electrode 125 through a contact hole in the second planarization layer 115d to thereby be electrically connected to the thin film transistor 120.

The anode 131 may be formed of a transparent conductive material, such as indium tin oxide (ITO), indium zinc oxide (IZO), or the like, but is not limited thereto.

When the flexible display device 100 is a top emission type display device that emits light to an upper portion thereof where the cathode 133 is disposed, it may further include a reflective layer such that the emitted light is reflected from the anode 131 to be smoothly emitted in a direction toward the upper portion where the cathode 133 is disposed.

The anode 131 may be a two-layer structure in which a transparent conductive layer formed of a transparent conductive material and a reflective layer are sequentially stacked, or a three-layer structure in which a transparent conductive layer, a reflective layer and a transparent conductive layer are sequentially stacked. The reflective layer may be formed of silver (Ag) or an alloy including silver.

A bank 115e disposed on the anode 131 and the second planarization layer 115d may define the sub-pixels by dividing areas that actually emit light. After forming a photoresist on the anode 131, the bank 115e may be formed by photolithography. Photoresist refers to a photosensitive resin whose solubility in a developer is changed by the action of light, and a specific pattern may be obtained by exposing and developing the photoresist. Types of photoresist may be classified into a positive photoresist and a negative photoresist. The positive photoresist is a photoresist where solubility of an exposed portion thereof in the developer is increased by exposure. When the positive photoresist is developed, a pattern from which exposed portions are removed is obtained. The negative photoresist is a photoresist where solubility of the exposed portion thereof in the developer is significantly lowered by the exposure. When the negative photoresist is developed, a pattern from which non-exposed portions are removed is obtained.

A fine metal mask (FMM) which is a deposition mask, may be used to form the light emitting unit 132 of the light emitting element 130.

In addition, to prevent damage that may occur due to contact with the deposition mask disposed on the bank 115e and to maintain a constant distance between the bank 115e and the deposition mask, a spacer 115f formed of one of polyimide which is a transparent organic material, photo acryl, and benzocyclobutene may be disposed on the bank 115e.

The light emitting unit 132 may be disposed between the anode 131 and the cathode 133.

The light emitting unit 132 serves to emit light and may include at least one of a hole injection layer (HIL), a hole transport layer (HTL), a light emitting layer, an electron transport layer (ETL), and an electron injection layer (EIL), and some components may be omitted depending on a structure or characteristics of the flexible display device 100. Here, an electroluminescent layer and an inorganic emitting layer may be used as the light emitting layer.

The hole injection layer is disposed on the anode 131 to facilitate an injection of holes.

The hole transport layer is disposed on the hole injection layer to smoothly transport holes to the light emitting layer.

The light emitting layer is disposed on the hole transport layer and may include a material capable of emitting light of a specific color to thereby emit light of a specific color. In addition, a light emitting material may be formed using a phosphorescent material or a fluorescent material.

The electron injection layer may be further disposed on the electron transport layer. The electron injection layer is an organic layer that facilitates an injection of electrons from the cathode 133 and may be omitted depending on the structure and characteristics of the flexible display device 100.

Meanwhile, at a position adjacent to the light emitting layer, an electron blocking layer or a hole blocking layer that blocks a flow of holes or electrons is further disposed to thereby prevent a phenomenon in which when electrons are injected into the light emitting layer, the electrons move from the light emitting layer and pass to the adjacent hole transport layer or a phenomenon in which when holes are injected into the light emitting layer, the holes move from the light emitting layer and pass to the adjacent electron transport layer, so that luminous efficiency may be improved.

The cathode 133 is disposed on the light emitting unit 132 and serves to supply electrons to the light emitting unit 132. Since the cathode 133 needs to supply electrons, it may be formed of a metal material such as magnesium (Mg), silver-magnesium, which is a conductive material having a low work function, but is not limited thereto.

When the flexible display device 100 is a top emission type display device, the cathode 133 may be a transparent conductive oxide such as indium tin oxide (ITO), indium zinc oxide (IZO), indium tin zinc oxide (ITZO), zinc oxide (ZnO), and tin oxide (TO).

An encapsulation part 115g may be disposed on the light emitting element 130 to prevent the thin film transistor 120 and the light emitting element 130, which are components of the flexible display device 100, from being oxidized or damaged due to moisture, oxygen, or impurities introduced from the outside. The encapsulation part 115g may be formed by stacking a plurality of encapsulation layers, a foreign material compensation layer, and a plurality of barrier films.

The encapsulation layer may be disposed on the entire surface of an upper portion of the thin film transistor 120 and the light emitting element 130, and may be formed of one of silicon nitride (SiNx) or aluminum oxide (AlyOz) which is an inorganic material. However, the present disclosure is not limited thereto. An encapsulation layer may be further disposed on the foreign material compensation layer.

The foreign material compensation layer is disposed on the encapsulation layer, and an organic material such as silicon oxycarbon (SiOCz), acrylic (acryl), or epoxy-based resin may be used for the foreign material compensation layer. However, the present disclosure is not limited thereto. When a defect occurs due to a crack generated by a foreign material or particles that may be generated during a process, it may be compensated for by covering a curve and a foreign material by the foreign material compensation layer.

A barrier film may be disposed on the encapsulation layer and the foreign material compensation layer, whereby the flexible display device 100 may delay the penetration of oxygen and moisture from the outside. The barrier film is configured in the form of a light-transmissive and double-sided adhesive film, and may be composed of any one of olefin-based, acrylic-based, and silicon-based insulating materials. Alternatively, a barrier film composed of any one of COP (cycloolefin polymer), COC (cycloolefin copolymer) and PC (Polycarbonate) may be further stacked, but is not limited thereto.

Then, FIG. 4B is a detailed cross-sectional view taken along line II-II' of the bending area BA described in FIG. 3.

Some components of FIG. 4B are substantially the same as or similar to those described in FIG. 4A, and thus, descriptions thereof will be omitted.

The gate signal and the data signal described with reference to FIGS. 1 to 3 are transmitted from the outside to the pixels disposed in the active area AA through the circuit lines disposed in the non-active area NA of the flexible display device 100, thereby allowing for light emission.

When the lines disposed in the non-active area NA including the bending area BA of the flexible display device 100 are formed in a single layer structure, a large amount of space for disposing the lines therein is required. After depositing a conductive material, the conductive material is patterned in a desired line shape by a process such as an etching process or the like. However, since there is a limitation in fineness of the etching process, a large amount of space is required due to a limit to narrowing a gap between the lines, and the area of the non-active area NA increases, which may cause difficulty in implementing a narrow bezel.

In addition, in a case in which one line is used to transmit one signal, when the corresponding line cracks, a corresponding signal may not be transmitted.

In a process of bending the substrate 111, cracks may occur in the line itself, or cracks may occur in other layers and propagate to the line. In this manner, when a crack occurs in the line, a signal to be transmitted may not be transmitted.

Accordingly, the line disposed in the bending area BA of the flexible display device 100 according to the example embodiment of the present disclosure may be disposed as a double line of a first line 141 and a second line 142.

The first line 141 and the second line 142 are formed of a conductive material, and may be formed of a conductive material having excellent ductility in order to reduce the occurrence of cracks when bending the flexible substrate 111.

The first line 141 and the second line 142 may be formed of a conductive material having excellent ductility, such as gold (Au), silver (Ag), or aluminum (Al). The first line 141 and the second line 142 may be formed of one of various conductive materials used in the active area AA, and may be formed of molybdenum (Mo), chromium (Cr), titanium (Ti), nickel (Ni), neodymium (Nd), copper (Cu), and an alloy of silver (Ag) and magnesium (Mg). In addition, the first line 141 and the second line 142 may be formed of a multilayer structure including various conductive materials, and may be formed of a three-layer structure of titanium (Ti)/aluminum (Al)/titanium (Ti). However, the present disclosure is not limited thereto.

To protect the first line 141 and the second line 142, a buffer layer formed of an inorganic insulating layer may be disposed under the first line 141 and the second line 142. A passivation layer formed of an inorganic insulating layer is formed to surround upper and side portions of the first line 141 and the second line 142, thereby preventing a phenomenon in which the first line 141 and the second line 142 react with moisture or the like and are corroded.

The first line 141 and the second line 142 formed in the bending area BA are subjected to tensile force when bent. As described in FIG. 3, the lines extending on the substrate 111 in the same direction as a bending direction are subjected to the greatest tensile force, and a crack may occur therein. If the crack is severe, disconnection may occur. Therefore, rather than forming the lines to extend in the bending direction, at least a portion of the lines disposed in an area including the bending area BA is formed to extend in a diagonal direction, which is a direction different from the bending direction, so that the tensile force may be minimized to reduce the occurrence of cracks. The line may be formed in a shape such as a rhombus shape, a triangular wave shape, a sinusoidal wave shape, a trapezoidal wave shape or the like, but is not limited thereto.

The first line 141 may be disposed on the substrate 111 and the first planarization layer 115c may be disposed on the first line 141. The second line 142 may be disposed on the first planarization layer 115c, and the second planarization layer 115d may be disposed on the second line 142. The first planarization layer 115c and the second planarization layer 115d may be formed of one or more of acrylic resin, epoxy resin, phenolic resin, polyamides resin, polyimides resin, unsaturated polyesters resin, polyphenylene resin, polyphenylene sulfides resin, and benzocyclobutene, but is not limited thereto.

A micro-coating layer 145 may be disposed on the second planarization layer 115d.

Since tensile force is applied to a line portion disposed on the substrate 111 when the substrate is bent to thereby occur cracks in the lines, the micro-coating layer 145 may serve to protect the lines by coating resin with a small thickness at a bending position.

Figure 5:
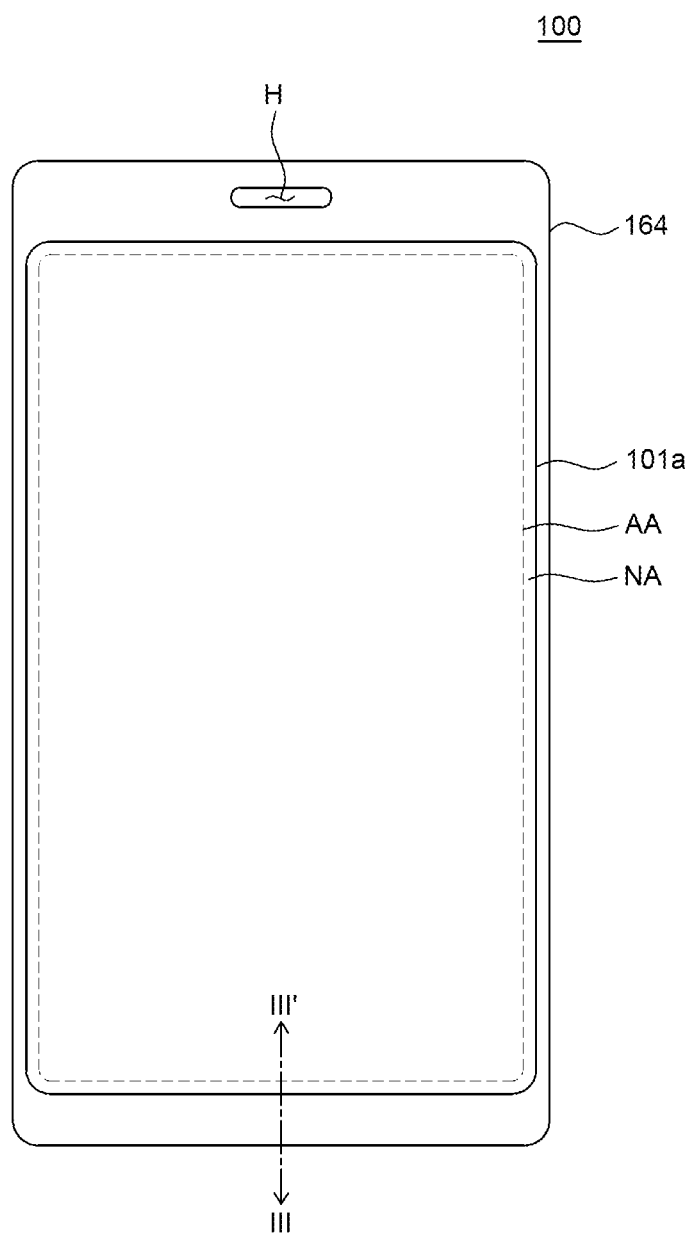
FIG. 5 is a plan view of the flexible display device according to the first example embodiment of the present disclosure.

FIG. 5 is a plan view of the flexible display device according to the first example embodiment of the present disclosure.

Figure 6:
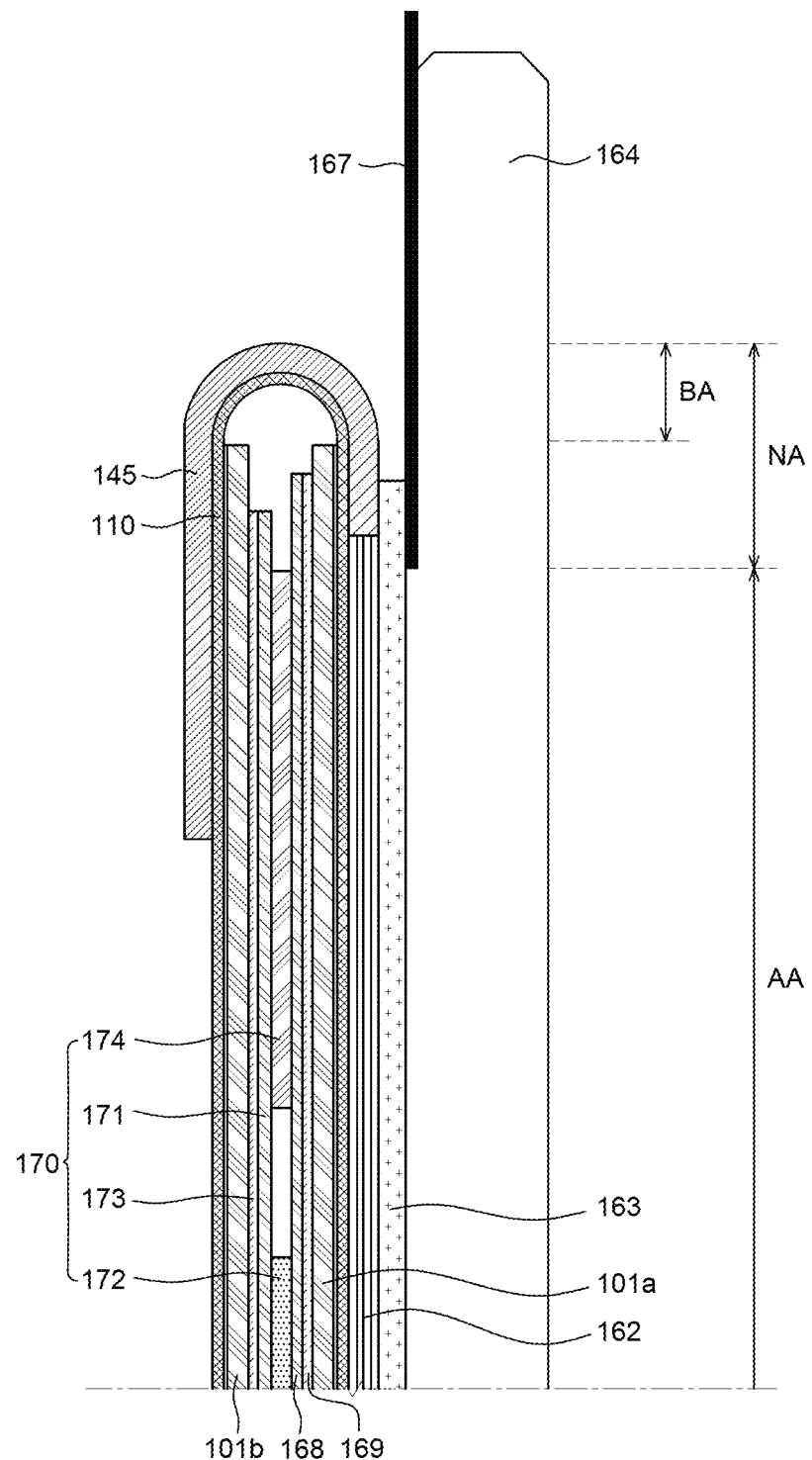
FIG. 6 is a cross-sectional view taken along line of FIG. 5.

FIG. 6 is a cross-sectional view taken along line of FIG. 5.

Figure 7:
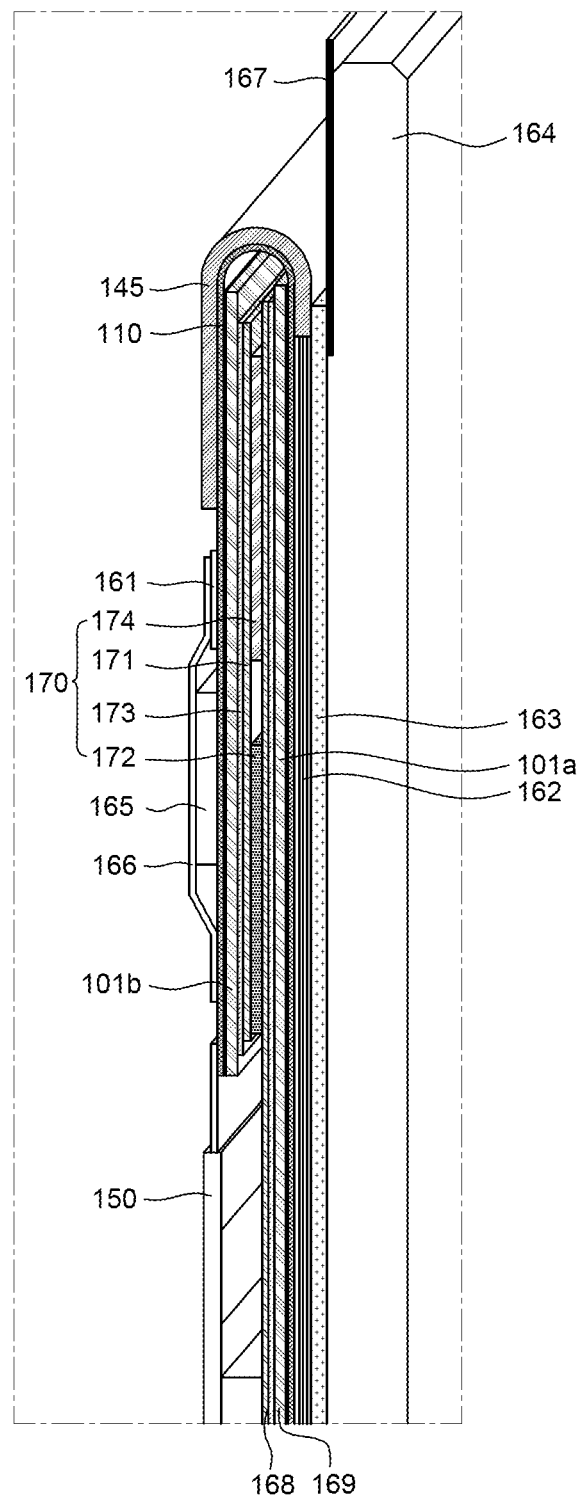
FIG. 7 is a perspective view of the flexible display device according to the first example embodiment of the present disclosure.

FIG. 7 is a perspective view of the flexible display device according to the first example embodiment of the present disclosure.

FIGS. 5 and 6 provide illustration with an omission of a middle frame for convenience.

FIG. 6 illustrates a cross-section of a lower edge of the flexible display device 100 according to the first example embodiment of the present disclosure as an example.

FIG. 7 is a perspective view illustrating a cross-section of the flexible display device 100 of FIG. 6.

The flexible display device 100 of FIGS. 5 to 7 exemplifies a case in which a hole H for a camera, an optical sensor, a receiver, or a fingerprint sensor is formed in an upper side of the flexible display device 100, but the present disclosure is not limited thereto and may not include a hole.

Referring to FIGS. 5 to 7, the flexible display device 100 according to the first example embodiment of the present disclosure may include the display panel 110, a polarizing plate 162, and a cover glass 164.

The display panel 110 may include a first flat portion, a second flat portion, and a curved portion positioned between the first flat portion and the second flat portion. The first flat portion corresponds to the active area AA having a plurality of sub-pixels and a portion of the non-active area NA, and is an area maintained in a flat state. The curved portion corresponds to the bending area BA.

The non-active area NA may be a bezel area surrounding edges of the active area AA.

The non-active area NA may include a pad portion defined outside the active area AA. The plurality of sub-pixels may be disposed in the active area AA. The sub-pixels may be arranged in a manner of R (red), G (green) and B (blue), or in a manner of R, G, B, and W (white) in the active area AA to thereby realize a full color. The sub-pixels may be divided by gate lines and data lines that intersect each other.

The second flat portion is an area facing the first flat portion, corresponds to a pad portion having pads that are bonded to a circuit element 150, and is an area maintained in a flat state.

The circuit element 150 may include bumps (or terminals) 161.

The bumps 161 of the circuit element 150 may be respectively bonded to the pads of the pad portion through an anisotropic conductive film (ACF). The circuit element 150 may be a chip on film (COF) in which a driving integrated circuit (IC) 165 is mounted on a flexible film. Also, the circuit element 150 may be implemented as a COG type that is directly bonded to pads on a substrate through a chip on glass (COG) process. Also, the circuit element 150 may be a flexible circuit such as a flexible flat cable (FFC) or a flexible printed circuit (FPC). In the following embodiments, the COF is mainly described as an example of the circuit element 150, but is not limited thereto. The driving IC 165 may be covered and protected by a cover shield 166, but is not limited thereto.

Driving signals supplied through the circuit element 150, for example, a gate signal and a data signal, may be supplied to the gate lines and data lines of the active area AA through the circuit lines such as routing lines.

In the flexible display device 100, in addition to the active area AA in which an input image is implemented, a sufficient space in which the pad portion, the circuit element 150 and the like can be positioned, needs to be secured. This space corresponds to a bezel area that is a non-active area NA, and the bezel area is recognized by a user positioned in front of the flexible display device 100 and may be a factor that somewhat degrades aesthetic senses.

Accordingly, the flexible display device 100 according to the first example embodiment of the present disclosure may be bent in a rear direction so that a lower edge of the display panel 110 has a predetermined curvature.

The lower edge of the display panel 110 may correspond to an outside of the active area AA, and may correspond to an area in which the pad portion is positioned. As the display panel 110 is bent, the pad portion may be positioned to overlap the non-active area NA in a rear direction of the non-active area NA. Accordingly, the bezel area that is recognized from a front surface of the flexible display device 100 may be minimized. Accordingly, a bezel width is reduced to thereby provide an effect of improving aesthetic senses.

To this end, a substrate of the display panel 110 may be formed of a flexible material that can be bent. For example, the substrate may be formed of a plastic material such as polyimide (PI). Further, the circuit line may be formed of a material having flexibility. The circuit line may be formed of a material such as a metal nano line, a metal mesh, or a carbon nanotube (CNT), but is not limited thereto.

Meanwhile, the curved portion is the bending area BA that is maintained in a bent state with a predetermined curvature.

In this case, for example, the bending area BA may have a "⊂" shape. That is, the curved portion extends from the first flat portion and may be bent at an angle of 180° in a rear direction. Accordingly, the second flat portion extending from the curved portion may be positioned to overlap the first flat portion in a rear of the first flat portion. Accordingly, the circuit element 150 that is bonded to the display panel 110 at the second flat portion thereof may be positioned in a rear direction of the first flat portion of the display panel 110. However, the present disclosure is not limited thereto, and the bending area BA may have a "⊂" shape and may be bent downwardly in a bent state. That is, the curved portion extends from the first flat portion, is bent at an angle of 180° in the rear direction and has a "⊂" shape, and at the same time, an entirety of the curved portion having the "⊂" shape may be bent downwardly while having a curvature.

Also, although not shown, a barrier film may be disposed on the display panel 110.

The barrier film is a component for protecting various components of the display panel 110 and may be disposed to correspond to at least the active area AA of the display panel 110. The barrier film is not necessarily required, and may be deleted depending on a structure of the flexible display device 100. The barrier film may be configured to include an adhesive material. The adhesive material may be a thermo-setting or self-curing adhesive, and may be formed of a material such as pressure sensitive adhesive (PSA), so that it may serve to fix the polarizing plate 162 on the barrier film.

The polarizing plate 162 disposed on the barrier film may suppress reflection of external light on the display panel 110. When the flexible display device 100 is externally used, external natural light may be introduced and may be reflected by a reflective layer included in an anode of an electroluminescent element, or reflected by an electrode formed of metal disposed under the electroluminescent element. An image of the flexible display device 100 may not be recognized well by the reflected light. The polarizing plate 162 polarizes light introduced from the outside in a specific direction, and prevents the reflected light from being re-emitted to the outside of the display device 100.

The polarizing plate 162 may be a polarizing plate composed of a polarizer and a protective film protecting the polarizer, and may be formed by coating a polarizing material for flexibility.

An adhesive layer 163 may be disposed on the polarizing plate 162, whereby the cover glass 164 for protecting an exterior of the display panel 110 may be bonded and disposed on the polarizing plate 162. That is, the cover glass 164 may be provided to cover the entire surface of the display panel 110 and serve to protect the display panel 110.

The adhesive layer 163 may include an optically clear adhesive (OCA).

A light blocking pattern 167 may be formed on four edges of the cover glass 164.

The light blocking pattern 167 may be formed on edges of a rear surface of the cover glass 164.

The light blocking pattern 167 may be extended to overlap a portion of the display panel 110, the adhesive layer 163, and the polarizing plate 162 that are disposed under the light blocking pattern 167.

The light blocking pattern 167 may be applied with black ink.

Although not shown, a touch screen panel may be further included on the display panel 110. In this case, the polarizing plate 162 may be positioned over the touch screen panel. When the touch screen panel is included, the cover glass 164 may be provided to cover at least a portion of the touch screen panel.

The touch screen panel may include a plurality of touch sensors. The touch sensor may be disposed at a position corresponding to the active area AA of the display panel 110. The touch sensor may include at least one of a mutual capacitance sensor and a self-capacitance sensor.

The mutual capacitance sensor includes a mutual capacitance formed between two touch electrodes. A mutual capacitance sensing circuit may apply a driving signal (or a stimulus signal) to any one of the two electrodes and sense a touch input based on variance of electric charges in the mutual capacitance through the other electrode. When a conductor approaches the mutual capacitance, the amount of electric charges in the mutual capacitance decreases, so that a touch input or gesture can be detected.

The self-capacitance sensor includes a self-capacitance formed in each of sensor electrodes. A self-capacitance sensing circuit can supply an electric charge to each sensor electrode and sense a touch input based on variance of electric charges in the self-capacitance. When a conductor approaches the self-capacitance, capacitance of the sensor is connected in parallel to capacitance of the conductor, thereby increasing a capacitance value. Therefore, in the case of a self-capacitance, when a touch input is sensed, the capacitance value of the sensor increases.

A plurality of holes (or openings) H may be provided in an upper side of the flexible display device 100. For example, the holes H may include an optical sensor hole, a receiver hole, a camera hole, and a fingerprint sensor hole (or a home button hole).

Back plates may be disposed on the rear surface of the display panel 110. When the substrate of the display panel 110 is formed of a plastic material such as polyimide, a manufacturing process of the flexible display device 100 is conducted in a situation in which a support substrate formed of glass is disposed on the rear surface of the display panel 110. After the manufacturing process is completed, the support substrate may be separated and released.

Since components for supporting the display panel 110 are required even after the support substrate is released, the back plates for supporting the display panel 110 may be disposed on the rear surface of the display panel 110 except for a portion of the bending area BA.

The back plates may prevent foreign materials from being attached to a lower portion of the substrate and may serve to buffer an impact from the outside.

In this case, the back plates may be composed of a first back plate 101a positioned on a rear surface of the first flat portion and a second back plate 101b positioned on a rear surface of the second flat portion. The first back plate 101a reinforces rigidity of the first flat portion, so that the first flat portion may be maintained in a flat state. The second back plate 101b reinforces rigidity of the second flat portion, so that the second flat portion may be maintained in a flat state. Meanwhile, to secure flexibility of the curved portion and facilitate a control of a neutral plane using the micro-coating layer 145, it is preferable not to position the first back plate 101*a* and the second back plate 101*b* on a rear surface of a part of the curved portion.

The first back plate 101*a* and the second back plate 101*b* may be formed of a plastic thin film that is formed of polyimide (PI), polyethylene naphthalate (PEN), polyethylene terephthalate (PET), polymers, or combinations of these polymers.

A metal plate 168 may be disposed on a rear surface of the first back plate 101*a*.

The metal plate 168 may be attached to the rear surface of the first back plate 101*a* using an adhesive 169. The metal plate 168 may be disposed to be retracted by a predetermined distance from an end of the first back plate 101*a*, but is not limited thereto.

The adhesive 169 may have an embossing pattern, but is not limited thereto.

The adhesive 169 may be formed of pressure sensitive adhesive (PSA).

The metal plate 168 may be formed of a metal material such as steel use stainless (SUS), and may serve to radiate heat, ground, and protect the rear surface. The metal plate 168 may be a composite heat dissipation sheet.

An adhesive member 170 of the present disclosure may be attached to a rear surface of the metal plate 168.

For example, the adhesive member 170 according to the first example embodiment of the present disclosure may include a support layer 171, a first adhesive layer 172 that is attached to an upper surface of the support layer 171, and a second adhesive layer 173 that is attached to a lower surface of the support layer 171. However, the present disclosure is not limited thereto.

The first adhesive layer 172 may be attached to the rear surface of the metal plate 168, and the second adhesive layer 173 may be attached to an upper surface of the second back plate 101*b*.

The support layer 171 may be formed of a metal material such as steel use stainless (SUS).

The adhesive member 170 according to the first example embodiment of the present disclosure includes the support layer 171 that is formed of a hard metal material instead of PSA that is a conventional soft foam, so that fixing force increases, thereby preventing cracks in the bending portion that may occur during drop evaluation. Thus, quality of the flexible display device 100 may be improved.

The adhesive member 170 according to the first example embodiment of the present disclosure may optionally further include a third adhesive layer 174 that is attached to the upper surface of the support layer 171.

The first adhesive layer 172 and the third adhesive layer 174 are positioned on the same plane, and may have a predetermined gap formed therebetween, but the present disclosure is not limited thereto.

The third adhesive layer 174 may have adhesive strength lower than that of the first adhesive layer 172 and the second adhesive layer 173. The third adhesive layer 174 may include a conductive material and have conductivity.

The adhesive member 170 may be disposed to be retracted by a predetermined distance from ends of the first and second back plates 101*a* and 101*b*. In addition, the adhesive member 170 may be disposed to be retracted by a predetermined distance from an end of the metal plate 168, but is not limited thereto.

The first adhesive layer 172 and the third adhesive layer 174 may be disposed to be retracted by a predetermined distance from ends of the support layer 171 and the second adhesive layer 173, but are not limited thereto.

An end of the adhesive member 170 may be disposed in the non-active area NA between the bending area BA and the active area AA.

The light blocking pattern 167 may overlap a portion of the adhesive member 170.

In addition, in the adhesive member 170 according to the first example embodiment of the present disclosure, the third adhesive layer 174 having conductivity is disposed on the support layer 171 formed of a metal material and thus, the adhesive member 170 is conducted with the metal plate 168, so that a ground path increases and grounding force may be enhanced.

A detailed structure of the adhesive member 170 will be described in detail with reference to FIGS. 8A and 8B.

Meanwhile, a micro-coating layer 145 may be disposed on the bending area BA of the display panel 110. The micro-coating layer 145 may be formed to cover one side of the barrier film.

The micro-coating layer 145 may be formed such that one side thereof partially overlaps the first back plate 101*a* and is bent together with the curved portion of the display panel 110 so that the other side thereof partially overlaps the second back plate 101*b*, but the present disclosure is not limited thereto.

One side of the micro-coating layer 145 may extend to the polarizing plate 162 and be in contact with a side surface of the polarizing plate 162. In this case, the adhesive layer 163 may be disposed between the polarizing plate 162 and the cover glass 164 to cover one side of the micro-coating layer 145.

One end of the micro-coating layer 145 may be disposed between the support layer 171 and the third adhesive layer 174.

Since tensile force is applied to the circuit lines disposed on the display panel 110 when the display panel 110 is bent to thereby occur cracks in the lines, the micro-coating layer 145 may serve to protect the lines by coating resin with a small thickness at a bending position.

The micro-coating layer 145 may be formed of an acrylic material such as an acrylate polymer, but is not limited thereto.

The micro-coating layer 145 may adjust a neutral plane of the bending area BA.

As described above, the neutral plane may mean a virtual surface that is not stressed because compressive force and tensile force applied to structures cancel each other when the structures are bent. When two or more structures are stacked, a virtual neutral plane may be formed between the structures. When the entirety of the structures is bent in one direction, the structures disposed in the bending direction with respect to the neutral plane are compressed by bending, and thus, are subjected to compressive force. On the contrary, the structures disposed in a direction opposite to the bending direction with respect to the neutral plane are stretched by bending and thus, are subjected to tensile force. In addition, since the structures are more vulnerable when they are subjected to tensile force among the same levels of compressive force and tensile force, the probability of crack occurrence is higher when they are subjected to tensile force.

The flexible substrate of the display panel 110 disposed under the neutral plane is compressed and thus, is subjected to compressive force. The circuit lines disposed above the neutral plane may be subjected to tensile force and due to the tensile force, cracks may occur in the circuit lines. Therefore, to minimize the tensile force to be received by the circuit lines, the micro-coating layer 145 may be positioned above the neutral plane.

By disposing the micro-coating layer 145 on the bending area BA, the neutral plane may be raised upwardly and the neutral plane is formed at a position the same as that of the circuit lines or the circuit lines are positioned at a position higher than that of the neutral plane. Thus, the circuit lines are not stressed or are subjected to compressive force during bending, whereby the occurrence of cracks may be suppressed.

The circuit element 150 may be connected to an end portion of the second flat portion of the display panel 110.

Various lines for transmitting signals to the pixels disposed in the active area AA may be formed on the circuit element 150.

The circuit element 150 may be formed of a material having flexibility so that it is bendable.

The driving IC 165 may be mounted on the second flat portion of the display panel 110 and be connected to the lines formed on the circuit element 150 to thereby provide the sub-pixels disposed in the active area AA with driving signals and data.

The circuit element 150 may be a flexible printed circuit board (FPCB).

The micro-coating layer 145 of the first example embodiment of the present disclosure may be formed to cover one side of the barrier film on the bending area BA of the display panel 110, and may be extended to cover the side surface of the polarizing plate 162 so as to further suppress occurrence of cracks. However, the present disclosure is not limited thereto.

Figure 8A:
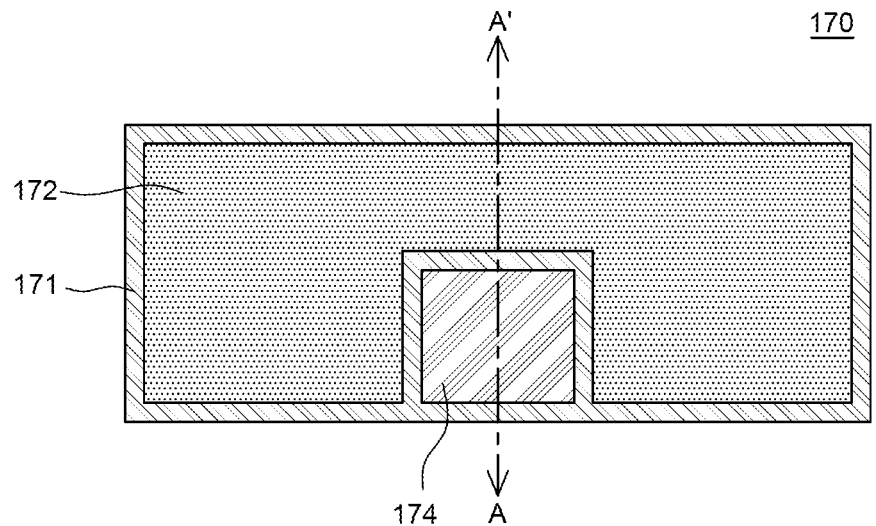
FIG. 8A is a plan view of an adhesive member according to the first example embodiment of the present disclosure.

FIG. 8A is a plan view of an adhesive member according to the first example embodiment of the present disclosure.

Figure 8B:
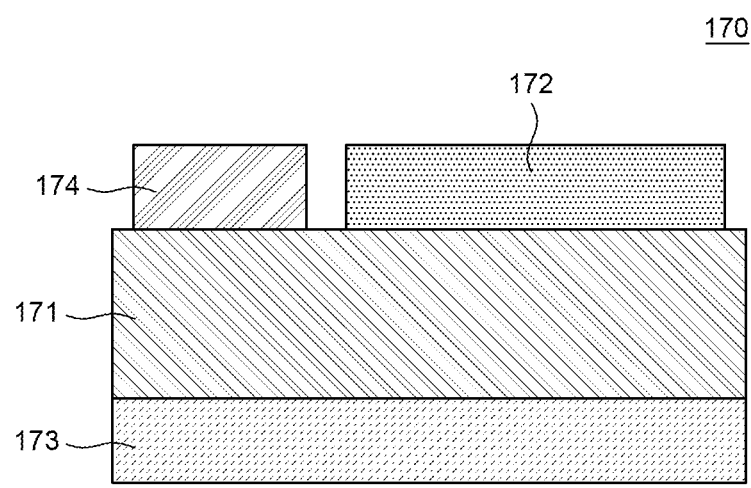
FIG. 8B is a cross-sectional view taken along line A-A' of FIG. 8A.

FIG. 8B is a cross-sectional view taken along line A-A' of FIG. 8A.

FIG. 8A is a plan view of the adhesive member 170 according to the first example embodiment of the present disclosure as viewed from an upper cover glass side, and shows a state in which the second adhesive layer 173 disposed therebelow is covered by the support layer 171.

Referring to FIGS. 8A and 8B, for example, the adhesive member 170 according to the first example embodiment of the present disclosure may include the support layer 171, the first adhesive layer 172 that is attached to the upper surface of the support layer 171, and the second adhesive layer 173 that is attached to the lower surface of the support layer 171.

The support layer 171 may be formed of a metal material such as steel use stainless (SUS).

For example, the support layer 171 may have a thickness of about 45 µm to 55 µm, but is not limited thereto.

The adhesive member 170 according to the first example embodiment of the present disclosure includes the support layer 171 that is formed of a hard metal material instead of PSA that is a conventional soft foam, so that fixing force increases, thereby preventing cracks in the bending portion that may occur during drop evaluation. Thus, quality of the flexible display device 100 may be improved.

The support layer 171 and the second adhesive layer 173 may have the same width by attaching the second adhesive layer 173 to a rear surface of the support layer 171 and then, cutting them at once, but the present disclosure is not limited thereto.

The adhesive member 170 according to the first example embodiment of the present disclosure may optionally further include the third adhesive layer 174 that is attached to the upper surface of the support layer 171.

The first adhesive layer 172 and the third adhesive layer 174 are positioned on the same plane, and may have a predetermined gap formed therebetween, but the present disclosure is not limited thereto.

The third adhesive layer 174 may be disposed in a central portion of the support layer 171. In addition, the third adhesive layer 174 may be disposed in the form of an island at a portion of a front end of the central portion of the support layer 171. In this case, in the first adhesive layer 172, a portion of a front end of a central portion thereof in which the third adhesive layer 174 is disposed may be removed, and in this case, the first adhesive layer 172 and the third adhesive layer 174 may be disposed to have a predetermined gap therebetween. However, the present disclosure is not limited thereto. Here, a front end portion of the third adhesive layer 174 means a portion adjacent to the curved portion where the display panel is bent.

The first adhesive layer 172 and the third adhesive layer 174 may be disposed to be retracted by a predetermined distance from the ends of the support layer 171 and the second adhesive layer 173, but are not limited thereto.

For example, the first adhesive layer 172, the third adhesive layer 174, and the second adhesive layer 173 may have a thickness of about 30 µm-40 µm, but the present disclosure is not limited thereto. For example, in the adhesive member 170 according to the first example embodiment of the present disclosure, the support layer 171 may have a thickness of 50 µm, and the first adhesive layer 172, the third adhesive layer 174, and the second adhesive layer 173 may respectively have a thickness of 35 µm, and thus, the adhesive member 170 may have a total thickness of 120 µm. As another example, in the adhesive member 170 according to the first example embodiment of the present disclosure, the support layer 171 may have a thickness of 45 µm, and the first adhesive layer 172, the third adhesive layer 174, and the second adhesive layer 173 may respectively have a thickness of 70 µm and 35 µm, and thus, the adhesive member 170 may have a total thickness of 150 µm. However, the present disclosure is not limited thereto.

The first adhesive layer 172, the second adhesive layer 173, and the third adhesive layer 174 may be formed of pressure sensitive adhesive (PSA), but the present disclosure is not limited thereto.

The third adhesive layer 174 may include a conductive material and have conductivity. Accordingly, the third adhesive layer 174 may have adhesive strength lower than that of the first adhesive layer 172 and the second adhesive layer 173.

In the adhesive member 170 according to the first example embodiment of the present disclosure, the third adhesive layer 174 having conductivity over the support layer 171 of a metal material is disposed at a surface to which the metal plate 168 is attached and thus, is conducted with the metal plate 168, so that a ground path increases and grounding force may be enhanced. That is, a ground path which is connected to the third adhesive layer 174 and the support layer 171 through the metal plate 168 may be formed in the display panel, and accordingly, grounding force may be enhanced.

As described above, the third adhesive layer 174 may be disposed on a portion of a front end of a central portion of the surface that is bonded to the metal plate 168, and the third adhesive layer 174 has adhesive strength lower than that of the first adhesive layer 172 and the second adhesive layer 173. Thus, an attachment area of the third adhesive layer 174 may be set in consideration of a total adhesive strength of the first adhesive layer 172 and the third adhesive layer 174.

However, the present disclosure is not limited thereto, and the third adhesive layer of the present disclosure may be disposed in a center of the support layer, or may be disposed at a portion of front ends of left and right sides of the support layer. This will be described in detail with reference to FIGS. 9 and 10 below.

Figure 9:
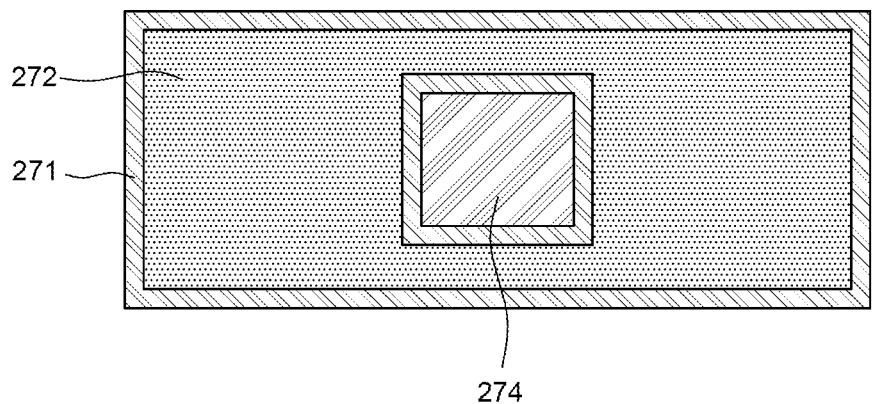
FIG. 9 is a plan view of an adhesive member according to the second example embodiment of the present disclosure.

FIG. 9 is a plan view of an adhesive member according to the second example embodiment of the present disclosure.

An adhesive member 270 according to the second example embodiment of the present disclosure of FIG. 9 has substantially the same configuration as the adhesive member 170 according to the first example embodiment of the present disclosure of FIGS. 8A and 8B except for a disposition position thereof. Accordingly, the same reference numerals are used for the same components.

FIG. 9 is a plan view of the adhesive member 270 according to the second example embodiment of the present disclosure as viewed from an upper cover glass side, and shows a state in which a second adhesive layer disposed therebelow is covered by the supporting layer 271.

Referring to FIG. 9, for example, the adhesive member 270 according to the second example embodiment of the present disclosure may include a support layer 271, a first adhesive layer 272 that is attached to an upper surface of the support layer 271, and a second adhesive layer that is attached to a lower surface of the support layer 271.

The support layer 271 may be formed of a metal material such as steel use stainless (SUS).

The adhesive member 270 according to the second example embodiment of the present disclosure may optionally further include a third adhesive layer 274 that is attached to the upper surface of the support layer 271.

The first adhesive layer 272 and the third adhesive layer 274 are positioned on the same plane, and may have a predetermined gap formed therebetween, but the present disclosure is not limited thereto.

The third adhesive layer 274 may be disposed in a center of the support layer 271. Specifically, the third adhesive layer 274 may be disposed in the form of an island in the center that is spaced apart from upper and lower ends of the support layer 271 by a predetermined distance. In this case, a central portion of the first adhesive layer 272 in which the third adhesive layer 274 is disposed may be removed, and the first adhesive layer 272 and the third adhesive layer 274 may have a predetermined gap therebetween. However, the present disclosure is not limited thereto.

As described above, when the third adhesive layer 274 is disposed in the center of the support layer 271, it may be more strongly bonded to the metal plate compared to a case in the first example embodiment.

The first adhesive layer 272 may be disposed to be retracted by a predetermined distance from ends of the support layer 271 and the second adhesive layer, but the present disclosure is not limited thereto.

The first adhesive layer 272, the second adhesive layer and the third adhesive layer 274 may be formed of PSA, but the present disclosure is not limited thereto.

The third adhesive layer 274 may include a conductive material and have conductivity. Accordingly, the third adhesive layer 274 may have adhesive strength lower than that of the first adhesive layer 272 and the second adhesive layer.

Figure 10:
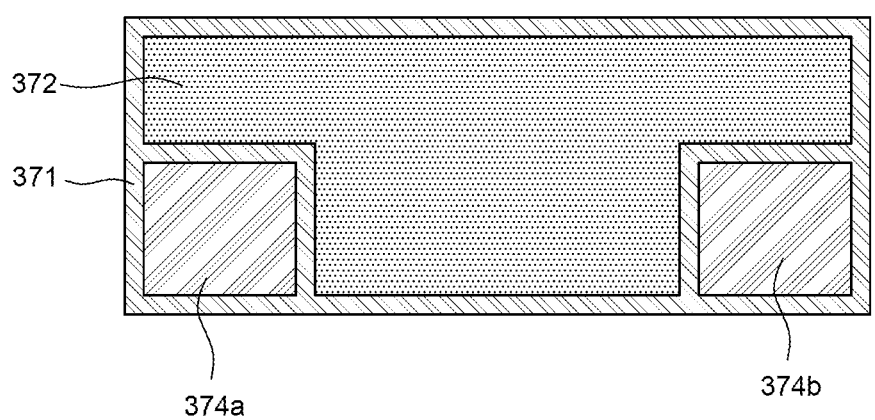
FIG. 10 is a plan view of an adhesive member according to a third example embodiment of the present disclosure.

FIG. 10 is a plan view of an adhesive member according to a third example embodiment of the present disclosure.

An adhesive member 370 according to the third example embodiment of the present disclosure of FIG. 10 has substantially the same configuration as the adhesive member 170 according to the first example embodiment of the present disclosure of FIGS. 8A and 8B except for a disposition position thereof. Accordingly, the same reference numerals are used for the same components.

FIG. 10 is a plan view of the adhesive member 370 according to the third example embodiment of the present disclosure as viewed from an upper cover glass side, and shows a state in which a second adhesive layer disposed therebelow is covered by a support layer 371.

Referring to FIG. 10, the adhesive member 370 according to the third example embodiment of the present disclosure may include a support layer 371, a first adhesive layer 372 that is attached to an upper surface of the support layer 371, and a second adhesive layer that is attached to a lower surface of the support layer 371.

The support layer 371 may be formed of a metal material such as steel use stainless (SUS).

The adhesive member 370 according to the third example embodiment of the present disclosure may further optionally include third adhesive layers 374a and 374b that are attached to the upper surface of the support layer 371.

In this case, the first adhesive layer 372 and the third adhesive layers 374a and 374b are positioned on the same plane, and may have a predetermined gap formed therebetween, but the present disclosure is not limited thereto.

The third adhesive layers 374a and 374b may be disposed on left and right sides of the support layer 371. That is, the third adhesive layers 374a and 374b may include a first-third adhesive layer 374a that is disposed in an island shape on the left side of the support layer 371 and a second-third adhesive layer 374b that is disposed in an island shape on the right side of the support layer 371. In this case, in the first adhesive layer 372, portions of the left and right sides thereof in which the third adhesive layers 374a and 374b are disposed may be removed, and the first adhesive layer 372 and the third adhesive layers 374a and 374b may be formed to have a predetermined gap therebetween. However, the present disclosure is not limited thereto.

As described above, when the third adhesive layers 374a and 374b are disposed on the left and right sides of the support layer 371, a ground path increases compared to the first and second example embodiments, so that grounding force can be enhanced.

The first adhesive layer 372 and the third adhesive layers 374a and 374b may be disposed to be retracted by a predetermined distance from ends of the support layer 371 and the second adhesive layer, but are not limited thereto.

The first adhesive layer 372, the second adhesive layer, and the third adhesive layers 374a and 374b may be formed of PSA, but are not limited thereto.

The third adhesive layers 374a and 374b may include a conductive material and have conductivity. Accordingly, the third adhesive layers 374a and 374b may have adhesive strength lower than that of the first adhesive layer 372 and the second adhesive layer.

The example embodiments of the present disclosure can also be described as follows:

According to an aspect of the present disclosure, there is provided a flexible display device. The flexible display device includes a display panel including an active area, a non-active area, and a bending area and having one edge that is bent in a rear direction to have a predetermined curvature, first and second back plates disposed on a rear surface of the display panel, a metal plate disposed on a rear surface of the first back plate and an adhesive member disposed between the metal plate and the second back plate, and including a support layer, a first adhesive layer and a third adhesive layer disposed on an upper portion of the support layer, and a second adhesive layer disposed on a lower portion of the support layer, wherein the third adhesive layer may include a conductive material and has conductivity.

The display panel may include a first flat portion corresponding to the active area and a portion of the non-active area, a second flat portion facing the first flat portion and a curved portion extending from the first flat portion and bent in the rear direction, and positioned between the first flat portion and the second flat portion, wherein the curved portion corresponds to the bending area, wherein the first back plate may be positioned on a rear surface of the first flat portion and the second back plate may be positioned on a rear surface of the second flat portion.

The adhesive member may be disposed to be retracted by a predetermined distance from ends of the first and second back plates.

The support layer may be made of a metal material.

The first adhesive layer and the third adhesive layer may be positioned on a same plane, and may have a predetermined gap formed therebetween.

The third adhesive layer may be disposed in an island shape at a portion of a front end of a central portion of the support layer.

In the first adhesive layer, a portion of a front end of a central portion thereof in which the third adhesive layer is disposed may be removed, so that the first adhesive layer and the third adhesive layer may have a predetermined gap therebetween.

The third adhesive layer may be disposed in a form of an island in a center that is spaced apart from upper and lower ends of the support layer by a predetermined distance.

In the first adhesive layer, a central portion thereof in which the third adhesive layer is disposed may be removed, so that the first adhesive layer and the third adhesive layer may have a predetermined gap therebetween.

The third adhesive layer may include a first-third adhesive layer that is disposed in an island shape on a left side of the support layer and a second-third adhesive layer that is disposed in an island shape on a right side of the support layer.

In the first adhesive layer, portions of left and right sides thereof in which the third adhesive layer is disposed may be removed, so that the first adhesive layer and the third adhesive layer may have a predetermined gap therebetween.

The first adhesive layer and the third adhesive layer may be disposed to be retreated by a predetermined distance from ends of the support layer and the second adhesive layer.

The first adhesive layer, the second adhesive layer, and the third adhesive layer may be made of pressure sensitive adhesive (PSA).

The third adhesive layer may have lower adhesive strength than that of the first adhesive layer and the second adhesive layer.

A ground path that is connected to the third adhesive layer and the support layer through the metal plate may be formed in the display panel.

According to another aspect of the present disclosure, there is provided a flexible display device. The flexible display device includes a display panel including a first flat portion, a second flat portion facing the first flat portion, and a curved portion extending from the first flat portion and bent in a rear direction, and positioned between the first flat portion and the second flat portion; a first back plate positioned on a rear surface of the first flat portion and a second back plate positioned on a rear surface of the second flat portion; a metal plate disposed on a rear surface of the first back plate; and an adhesive member disposed between the metal plate and the second back plate, and including a support layer, a first adhesive layer attached to an upper surface of the support layer, and a second adhesive layer attached to a lower surface of the support layer, wherein the support layer is made of a metal material.

Although the example embodiments of the present disclosure have been described in detail with reference to the accompanying drawings, the present disclosure is not limited thereto and may be embodied in many different forms without departing from the technical concept of the present disclosure. Therefore, the example embodiments of the present disclosure are provided for illustrative purposes only but not intended to limit the technical concept of the present disclosure. The scope of the technical concept of the present disclosure is not limited thereto. Therefore, it should be understood that the above-described example embodiments are illustrative in all aspects and do not limit the present disclosure. The protective scope of the present disclosure should be construed based on the following claims, and all the technical concepts in the equivalent scope thereof should be construed as falling within the scope of the present disclosure.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A flexible display device, comprising:
    a display panel including an active area, a non-active area, and a bending area, the display panel having one bent edge extending in a rear direction, the one bent edge having a curvature;
    a first back plate and a second back plate disposed on a rear surface of the display panel;
    a metal plate disposed on a rear surface of the first back plate; and
    an adhesive member disposed between the metal plate and the second back plate, the adhesive member including a support layer, a first adhesive layer and a second adhesive layer disposed on an upper portion of the support layer, and a third adhesive layer disposed on a lower portion of the support layer,
    wherein the second adhesive layer is conductive and includes a conductive material.

2. The flexible display device of claim 1, wherein the display panel includes:
    a first flat portion corresponding to the active area and a portion of the non-active area;
    a second flat portion facing the first flat portion; and
    a curved portion extending from the first flat portion and bent in the rear direction, the curved portion positioned between the first flat portion and the second flat portion, wherein the curved portion corresponds to the bending area of the display panel, wherein the first back plate is positioned on a rear surface of the first flat portion and the second back plate is positioned on a rear surface of the second flat portion.

3. The flexible display device of claim 1, wherein the adhesive member is spaced by a distance from ends of the first back plate and second back plate.

4. The flexible display device of claim 1, wherein the support layer is a metal material.

5. The flexible display device of claim 4, wherein the first adhesive layer and the second adhesive layer are positioned on a same plane with a gap therebetween.

6. The flexible display device of claim 5, wherein the second adhesive layer is disposed in an island shape at a portion of a front end of a central portion of the support layer.

7. The flexible display device of claim 6, wherein a portion of a front end of a central portion of the first adhesive layer is absent to accommodate the second adhesive layer and provide the gap between the first adhesive layer and the second adhesive layer.

8. The flexible display device of claim 5, wherein the second adhesive layer is disposed in a form of an island in a center of the support layer that is spaced apart from upper and lower ends of the support layer by a distance.

9. The flexible display device of claim 8, wherein a central portion of the first adhesive layer is absent to accommodate the second adhesive layer and provide the gap between the first adhesive layer and the second adhesive layer.

10. The flexible display device of claim 5, wherein the second adhesive layer includes a first layer portion that is disposed in an island shape on a left side of the support layer and a second layer portion that is disposed in an island shape on a right side of the support layer.

11. The flexible display device of claim 10, wherein portions of a left side and a right side of the first adhesive layer are absent to accommodate the first portion and the second portion of the second adhesive layer with the gap between the first adhesive layer and the first portion and the second portion of the second adhesive layer.

12. The flexible display device of claim 4, wherein the first adhesive layer, the second adhesive layer, and the third adhesive layer are a pressure sensitive adhesive (PSA).

13. The flexible display device of claim 12, wherein the display panel includes a ground path connected to the second adhesive layer and the support layer through the metal plate.

14. The flexible display device of claim 1, wherein the first adhesive layer and the second adhesive layer are spaced by a distance from ends of the support layer and the third adhesive layer.

15. The flexible display device of claim 1, wherein the second adhesive layer has a lower adhesive strength than an adhesive strength of the first adhesive layer and an adhesive strength of the third adhesive layer.

16. A flexible display device, comprising:
a display panel including a first flat portion, a second flat portion facing the first flat portion, and a curved portion extending from the first flat portion and bent in a rear direction, the curved portion positioned between the first flat portion and the second flat portion;
a first back plate positioned on a rear surface of the first flat portion;
a second back plate positioned on a rear surface of the second flat portion;
a metal plate disposed on a rear surface of the first back plate;
a polarizing plate disposed over the first flat portion of the display panel; and
an adhesive member disposed between the metal plate and the second back plate, the adhesive member including a support layer, a first adhesive layer attached to an upper surface of the support layer, and a second adhesive layer attached to a lower surface of the support layer,
wherein the support layer is a metal material, and
wherein the first flat portion of the display panel is disposed between the polarizing plate and the first back plate.

17. The flexible display device of claim 16, wherein the first adhesive layer includes a first portion and a second portion with a gap between the first portion and the second portion.

18. The flexible display device of claim 17, wherein the first portion and the second portion of the first adhesive layer are positioned on a same plane.

* * * * *